No Printed Specification Available
2 Sheets-Sheet 1.
9475X
A. Prutzmann,
Lock and Key.
Patented Mar. 4, 1836.
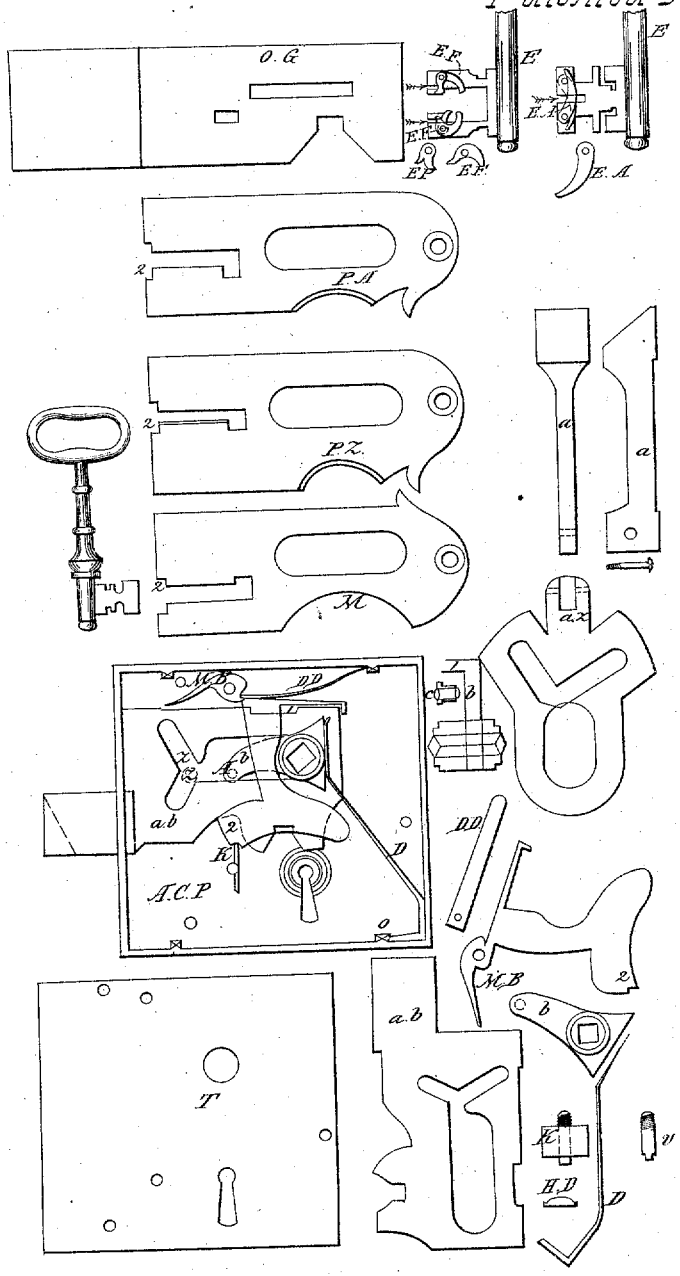
AM. PHOTO-LITHO. CO. N.Y. (OSBORNE'S PROCESS)

No Printed Specification Available
2 Sheets-Sheet 2.
9475X
A. Prutzmann,
Lock and Key.
Patented Mar. 4, 1836.
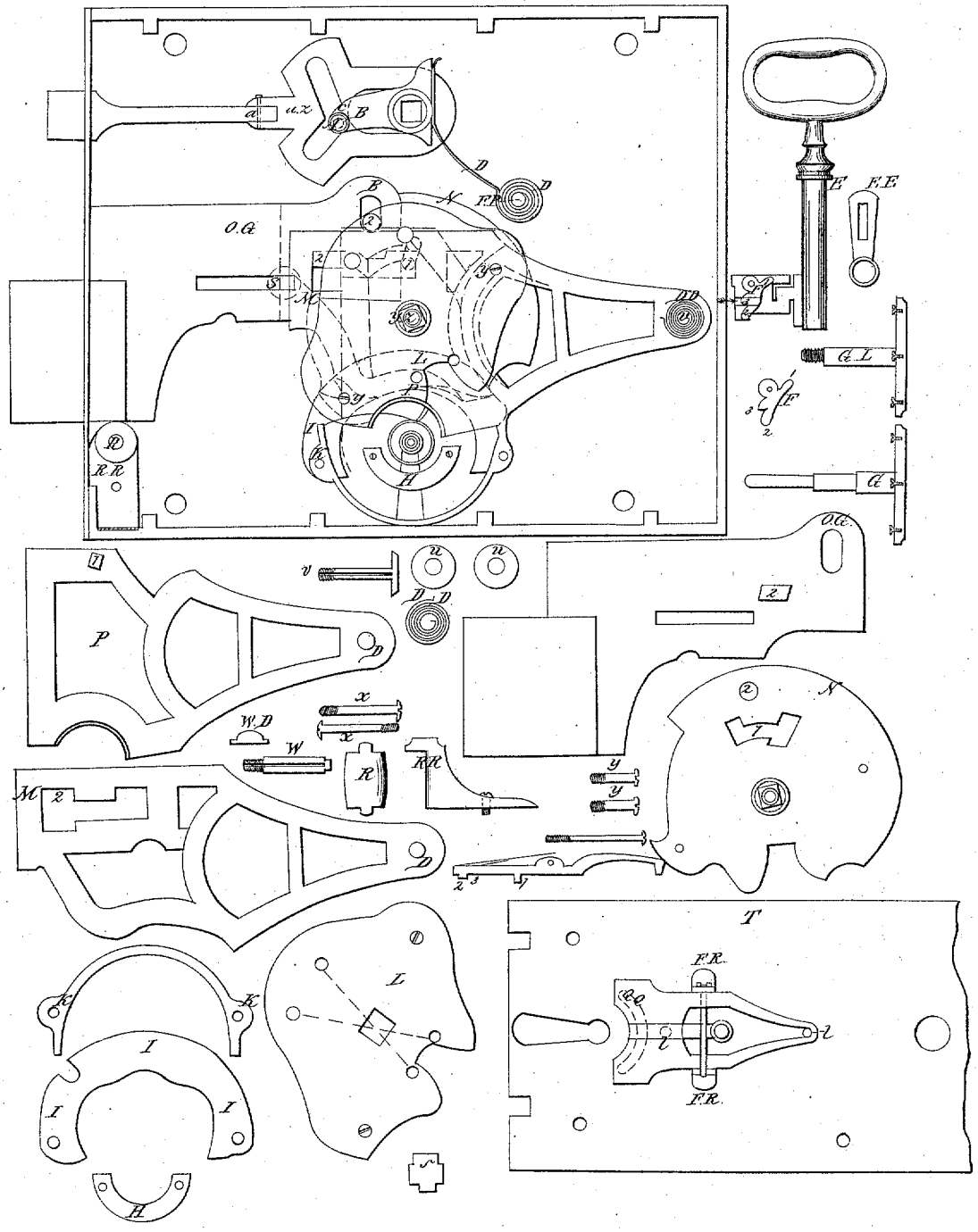
AM. PHOTO-LITHO. CO. N.Y. (OSBORNE'S PROCESS.)

Mar. 4. 1836

9475X

Augustus Brutzmann.
Letters Patent.

The schedule referred to in these Letters Patent and making part of the same, containing a description in the words of the said August Brutzmann himself of his improvement in the lever key and lock.

---

Specification of Augustus Brutzmanns Lever Key & lock, No. 1. it is almost impossible to give an exact representation on paper of the lever key, consisting of one or more levers, so as show how it locks if properly made. The key is made in the usual form of keys, with the necessary wards. in the bit of the key a mortice is cut through its whole depth, and a moveable lever is fastened to be operated on by a striking plate in the lock. The lock has two lever tumblers placed over each other and work parallel one to the other, from a common centre at one end having each a barrel in which is fixed a spring similar to the spring & barrel of a watch. between the two tumblers is a lever working on a centre and moved by the key. having at the top a stud on which the bolt is fastened, and a semicircular groove the length of which is adapted to the leverage of the key, and widened at each end to receive a square stud, projecting from the upper surface of the lower or depending tumblers, and which keeps the bolt confined when lock't or unlock't above this lever the bolt is placed and is fastened to the lever by the stud before mentioned, running through a hole in the bolt, on the upper surface of the bolt there is also a square stud on the bolt is placed the upper or ascending tumbler having a groove, the length of which is determined by the distance the bolt is moved, widened at each end to receive the stud from the bolt, and which also aids to keep the bolt confined, when lock't or unlock't.

Above this last or ascending tumbler is placed the lever plate working on the same centre with the lever, and fastened to the lever by screws.

Around the pin for the key is a semicircular board which is of the height of the key bit, to this is attached the striking plate. on the cap is placed a parallel tumbler regulated by a common spring having a pin at each end. penetrating through the plate, and adapted to enter holes in the lever plate.

The wards may be made according to fancy. whenever the key bit with its lever in
turning the key touches the striking plate the tumblers are put in motion, the lower part
of the lever touches a shoulder on the lower tumbler, and causes it to descend at the
same time the upper part of the lever touches a projection in the under part of the
parallel tumbler raises the pin at the end projecting through the cap, and into
the lever plate, thereby enabling the lever to be turned by the key bit—
These locks may be made with four or more tumblers, and two or more levers
in the key. Description of the Drawing. No. 1. E. is the key E.E. is a front view of
the key bit, marked with a flat mortice, in this mortice the levers are placed.
In drawing No. 2. are two of those keys both marked E. The front view of
the key bit is the same as E.E. before mentioned. E.A. is such a lever of which
two enter into one key bit E.P. & E.F. are two levers of which four enter into
one key bit which are fastened by rivetts, yet so as to be easily moveable.
The effect of these levers is to make the tumblers descend and ascend parallel
to each other. More levers may be thus applied but they are not required.
The wards are optional. The key bit here described is what I particularly
claim to have invented. No. 1. A.B.P. is the lock. The lock I am now about
describing works the contrary way to the common locks by a sort of lever, so
constructed as to work with ease, an advantage it has over common locks.
It however can be made so as to work the opposite way, or by a common
bolt, but this will not lock so easily, it can also be made to lock from one
side or both sides. The latch consists of two pieces the front being marked
A. the rear A. Z. its lever B. having a roller C. on pin A.D.D. is the spring
the circulating parts fastened by a rivett at M. which prevents its turning
round. I do not mean that the spring shall be exactly of this kind, for any
spring will answer the purpose, as will appear by D. in drawing No. 2. nor
is it requisite that the latch should consist of two pieces—it may be made
as in the lock A.C.P. drawing No. 2. where latch & bolt are in one piece.
This arrangement of the bolt & latch I also claim to be used with the lock
A.B.P. drawing 1. or as a seperate lock as in figure A.C.P. drawing No. 2.
which I shall now describe. The square hole for the knobs and the key hole
are both in a vertical line, but any other position will answer as well.
The lever has no roller C. as in A.B.P. drawing No. 1. the size of either of the locks is immaterial, and they may be made of iron or any other material a.b. is the bolt, b the lever, whenever the bolt is turned, the hook of the tumbler M.B. marked 1 must stand in the corner marked 1. in the bolt which is a little higher than the other space. As soon as you turn the knob the part of the tumbler M.B. marked 2 will lay against the pin K. having thus room sufficient from the tumbler. The pin A. of lever b must be made so as to rest in I. but by no means on the point, because it would be in the way when pushing against the door. The spring D. must have a fair bearing on the back of the lever b. so as to guide it. The tumbler M.B. is a common one and turns on a pin v. D.D. is the spring of the tumbler & D. the spring of the lever and holds the latch firmly, it is fastened by simply placing it behind the stud O. which is filed somewhat obliquely.

The plate T. rests on the four studs x o, and is fastened to the studs v.K. by burrs H.D. This latch can be opened at the same time with the key.

The wards & key are optional. To return to the description of the lock A.B.P. drawing No. 1. S is a pin or guide to the bolt O.G. is the bolt having an oblong hole on which it moves backwards & forwards on the pin S. at B. it has a second hole in a different direction to receive the round stud from the lever marked 2. This is so high as to reach through the bolt, there is also a square stud on the bolt 2. N is the lever having an axis or spindle reaching from the plate of the lock to its cap, so as to afford sufficient play to the descending tumbler. This axis or spindle is perforated and filed above 2. is the stud moveable in the hole B. of the bolt 1. is the hole for the stud from the tumbler to work in. The two round dots are screw holes, P is the descending tumbler, having in B. an elevation as exhibited in the drawing, and also a square stud 1. moveable in the hole 1. of the lever.

From the upper or lower side at D. a hole is nearly bored through so as to admit the spring D.D. then a small clinch is driven in, and in the centre a small hole bored fitting the pin of the spring which has likewise such a clinch. The spring is covered with with a plate N.. The spring must have at either end a small hook, and fitting the tumbler, the other the pin head. M. is a common tumbler working upwards. 2 is a hole for the square stud 2. on the bolt to move in at D. a hole is nearly bored through as before so as to admit the spring S.D. moving on the same pin. However it is not
required that the tumblers should move this way, they may be made to ascend
or descend G.L. is a spindle, [illegible] riveted with three screws to the plate on which
the lever moves. You then put the tumbler P. with spring on the pin V. and then
lever N on its pin G.L. so that the tumbler stud 1 works in its hole in the
lever 1. and the hole B, in the bolt O.G. over the round stud 2 from the lever
then put the common tumbler Mo. on the pin with the spring, which is then
covered with plate U. so that the holes 2 may fit the square stud on the
bolt, then fit the lever plate L with its square hole to lever N. so that M.S.
meet. W.D. is the female screw to fasten on V.L the lever plate is marked
with four principal holes, which by means of the parallel tumbler affords the
security, the other two holes are for screwing it on the lever Y.Y. are the two
screws R. is a roller sustaining the bolt head. R.R. is a stand for the
roller fastened with a screw. H is a ward G. is a pin for the key which
may be made without shoulders, it also is fastened to the lock plate with
screws, K is the round board, which is of the heighth of the key bit, it has in
its entire length two holes, and is cut in at either end so deeply as to fit
the two holes in the striking plate I. for I enters the cut high enough to
fit the cut in the key hole which on the drawing No. 2 is marked with
an arrow [illegible] J is the cap which is screwed on the lock through the round
board, and striking plate, by the two screws x.x. I.R. are two studs between
which the parallel tumbler is screwed, and which support the axis on
which it moves, this tumbler has two pins l.l. of which the one stands in
the holes of the lever plate L. the other is intended for a false lever and
secures the lock, the tumbler is marked Q.Q. designating at the same time
the elevated shoulder, which forms a semicircle, and goes through the
cap. The spring is riveted to the tumbler, and presses on the lever pin
G.L. whenever the key bit with its lever touches the striking plate, the
tumblers are put in motion, the lever of the key with the end 1. puts
the parallel tumbler in motion 2. the descending tumbler 3 is moved by
the striking plate. What I therefore claim as my invention is 1. the
key with its lever. 2°. the construction of the bolt, with its lever & lever
plate. 3°. The tumblers and striking plate operated on by levers in in the key-the bolt latch in one by their lever.
N.B. the construction of the large latch is like that of the small one
Witness
Jas Goodman
Jas Goodman
August. Pontzmann 2/12 [illegible]

Drawing